United States Patent

[11] 3,577,596

| [72] | Inventors | Calvin P. Bullard<br>East Longmeadow;<br>Francis P. Szubelick, Springfield, Mass. |
|---|---|---|
| [21] | Appl. No. | 740,179 |
| [22] | Filed | June 26, 1968 |
| [45] | Patented | May 4, 1971 |
| [73] | Assignee | Vigeant Gaston<br>East Longmeadow, Mass.<br>a fractional part interest |

[54] TWO-PHASE MOLD PRESS
10 Claims, 9 Drawing Figs.

[52] U.S. Cl. .................................................. 18/30
[51] Int. Cl. .................................................. B29f 1/00
[50] Field of Search.......................................... 18/30
(LA), 30 (LM), 30 (LT), 30 (LV), 5 (BO)

[56] References Cited
UNITED STATES PATENTS

| 2,262,615 | 11/1941 | Lester ............................ | 18/30 |
| 2,969,818 | 1/1961 | Allard ............................ | (18/30) |
| 3,262,158 | 7/1966 | Reimer et al. .................. | 18/30 |
| 3,449,795 | 6/1969 | Fischback ...................... | 18/30 |
| 3,452,397 | 7/1969 | Newton ......................... | 18/30 |

Primary Examiner—H. A. Kilby, Jr.
Attorney—John F. Carney

ABSTRACT: A two-stage power-operated press for closing molds as used in the manufacture of plastic articles by injection molding. The press incorporates a first fluid motor means for advancing and retracting the movable platen at a rapid traverse rate at relatively low pressure and a second fluid motor means for imparting a high-locking pressure to the movable platen at the end of its stroke in order to close the mating mold segments carried by the movable and fixed platens, respectively. The arrangement of the operating parts of the press is such as to achieve maximum platen stroke in order to obtain increased mold opening for accommodating molds for the manufacture of deep-draw articles.

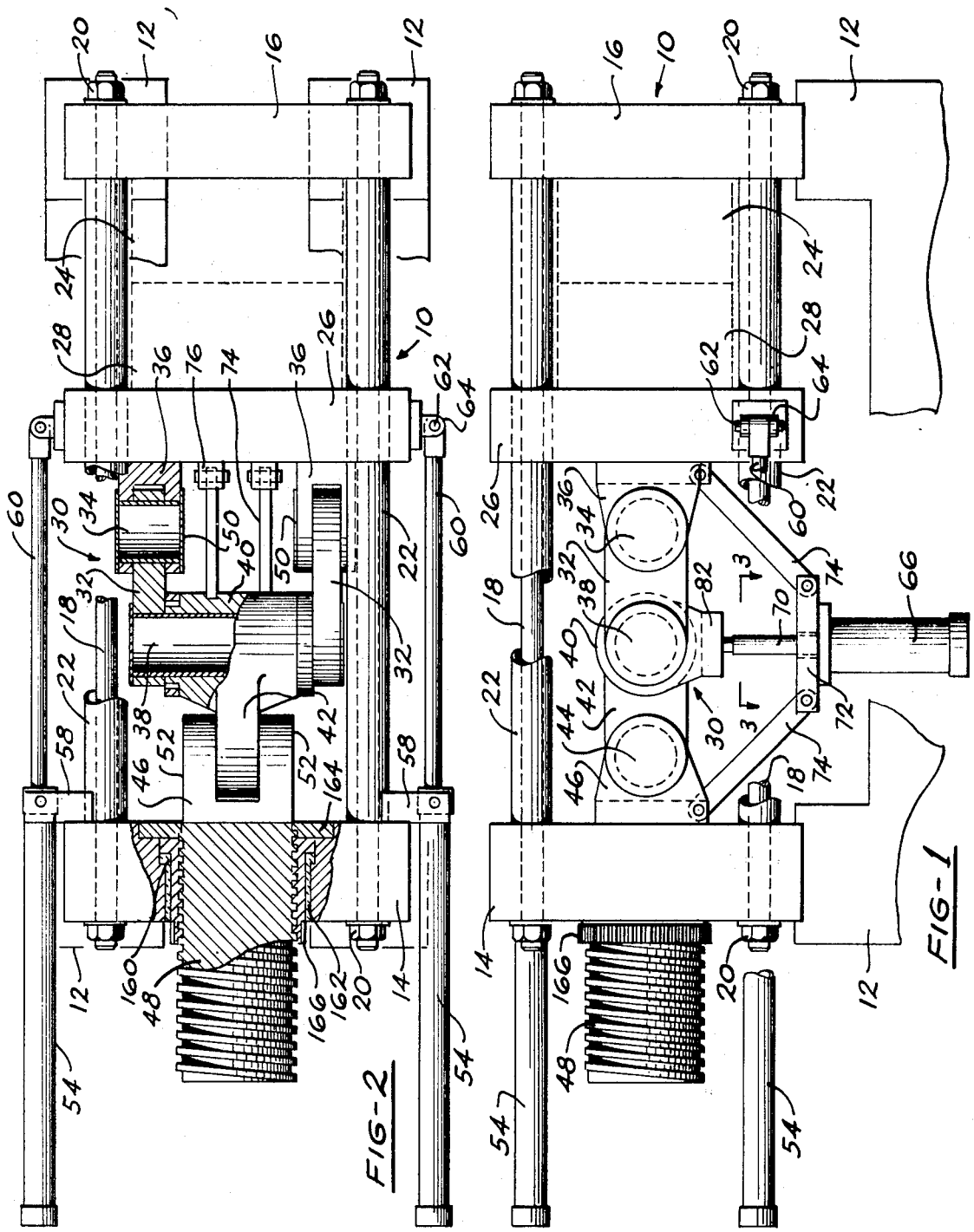

INVENTOR.
CALVIN P. BULLARD
FRANCIS P. SZUBELICK

INVENTOR.
CALVIN P. BULLARD
FRANCIS P. SZUBELICK

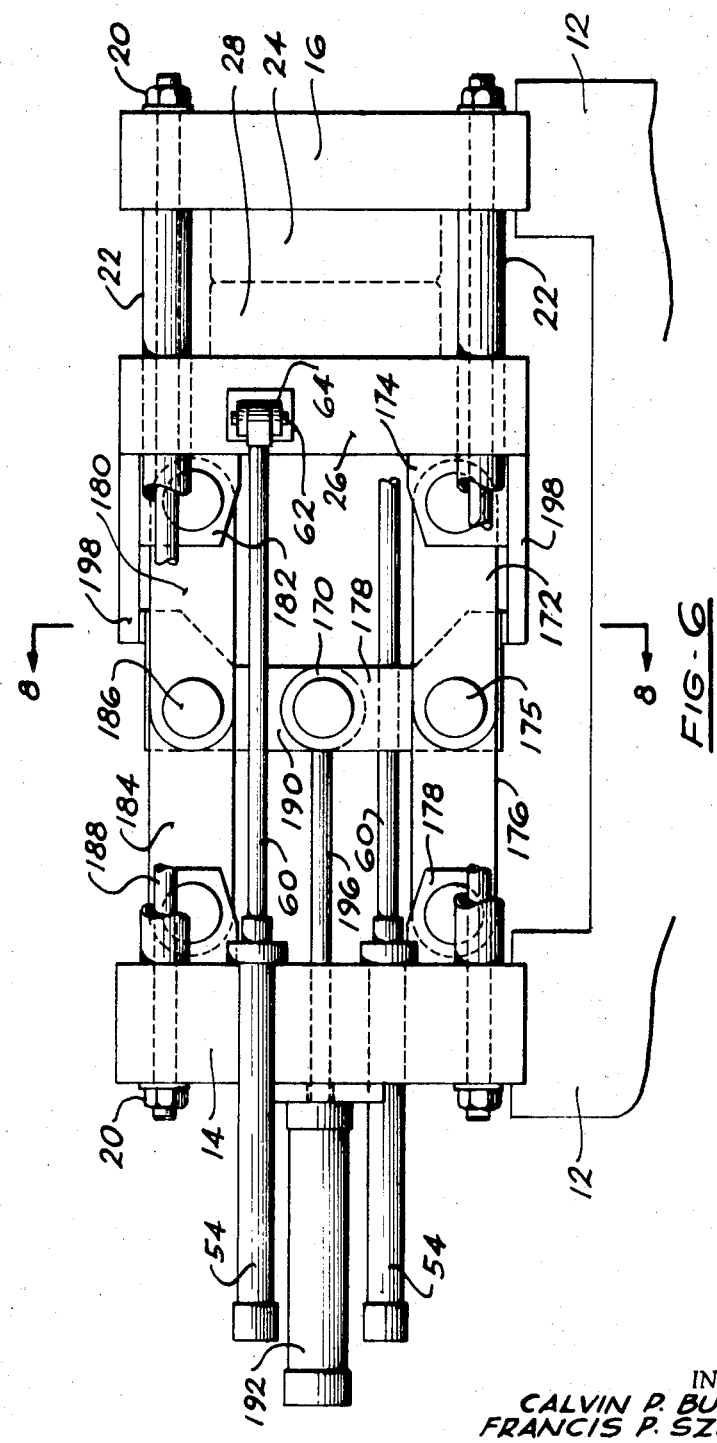

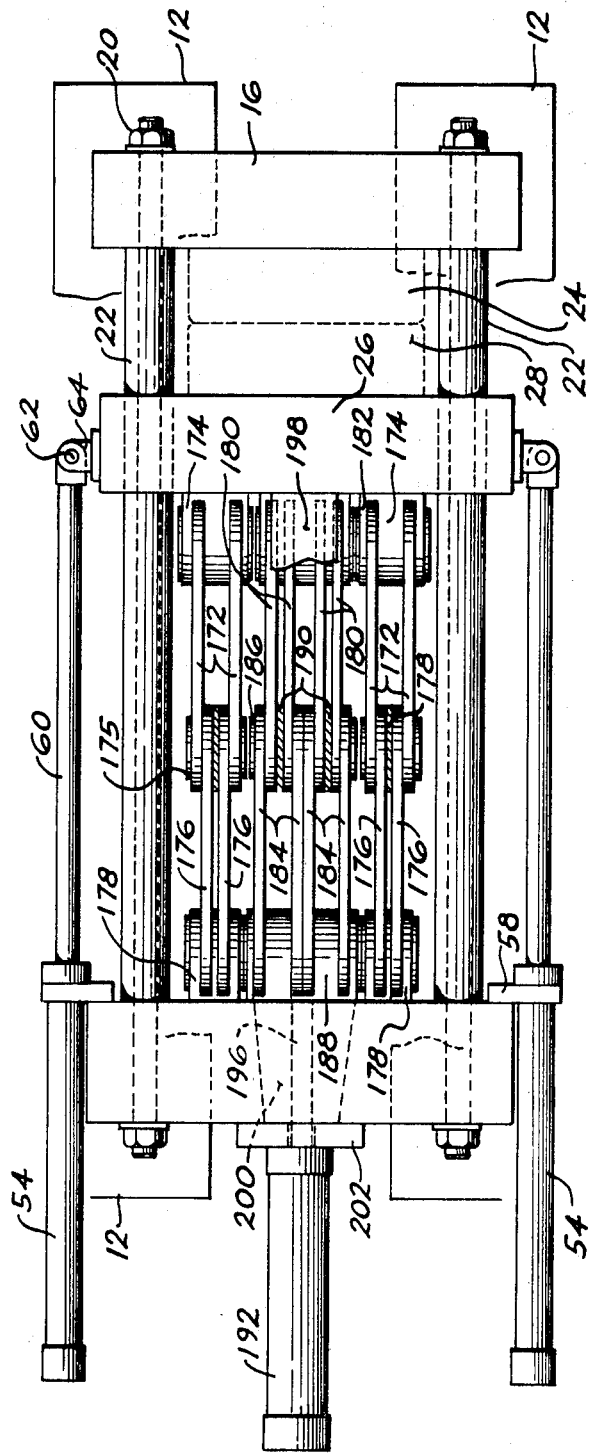

TWO-PHASE MOLD PRESS

BACKGROUND OF THE INVENTION

In the manufacture of plastic articles by injection molding, presses are employed to impart extremely high external forces on the opposed segments of a mold into which plastic is injected to form the molded article. These presses have a pair of platens, one fixed and the other movable, to which each of the pair of mold segments that constitutes the complete mold is attached. The steps of the molding process involve linearly moving the mold segment attached to the movable platen from a retracted position into registry with the other mold segment that is attached to the fixed platen thereby forming a complete mold into which the plastic material is injected. The mold segments are held in registry with one another under high pressure until such time as is required for the plastic to solidify whereupon the movable platen is retracted and the molded article, which is normally retained in the movable mold segment, is ejected therefrom.

For greatest efficiency of the molding process, it is desired that the linear movement, both forward and rearward, of the movable platen occur at a high velocity. At the same time, it is necessary that the force applied to the platens during the injection phase of the process be sufficiently high to prevent separation of the mold segments which would reduce the quality of the molded articles. Moreover, in order to prevent damage to the mold segments, it is desirable that, just prior to bringing the mold segments into registry with one another, the velocity of the movable platen be reduced and the pressure applied thereto be significantly lower than that required to impart the locking force.

Fluid-motor-operated toggle presses are well known in the art. Such presses employ a movable platen that is connected to the press frame by pivotable links whereupon the platen can undergo linear motion between a open and a closed position. Movement of the platen is effected by a fluid motor which, due to a mechanical advantage provided by the toggle links, is capable of imparting a locking force in excess of several tons. These presses do, however, generally suffer from the disadvantage, when a single fluid motor is employed to operate the platen of either having to sacrifice locking force in order to obtain increased platen velocity or of having to resort to cumbersome, complex mechanism in order to obtain both of these properties. Moreover, these presses are limited in the depth of the article that can be produced due to the fact that as the depth dimension of the molded article increases the stroke of the movable platen must also be increased in order that it can be retracted a sufficient distance to permit ejection of the finished article.

In presses heretofore known in the art, the increased platen stroke required for deep draw-molded articles was effected by increasing the length of the toggle links which, of course, required an increase in the length of the press frame and in many cases the use of larger structural members in the press assembly in order to withstand the increased stress imposed upon these members by the longer links. This disadvantage resulted in part from the fact that in toggle presses of prior art design it is impossible due to the arrangement of the mechanism to retract the movable platen to a position wherein the toggle links are in complete overlapping relation. Mechanism heretofore employed in the art restrict the retraction of the movable platen to a point considerably short of this overlapping position in order that the fluid motor be capable of generating a force victor operative to initiate movement of the platen.

It is therefore the principal object of the present invention to provide a toggle press of improved design capable of overcoming the disadvantages attendant in prior art press designs and of achieving the heretofore-mentioned desirable characteristics.

SUMMARY OF THE INVENTION

According to the invention the movable platen of a mold press is operatively connected to two, separate fluid motor means adapted to be operated in sequence. The first of these motor means comprises a pair of fluid motors, referred to as platen motors, connected between the end frame of the press and the movable platen on laterally opposed sides thereof. These motors consist of a piston-cylinder arrangement of relatively small diameter connected to a source of low-pressure fluid effective to advance and retract the platen at high velocity between an open and a closed position. The closed or extended position of the movable platen brings the mold segment attached thereto into registry with the segment attached to the fixed platen or just slightly short thereof. When the movable plate reaches its closed position the second fluid motor means is actuated to impart the clamping pressure between the two mold segments. This motor means, referred to as the clamping motor, includes a piston-cylinder arrangement of considerably greater diameter than the platen motors and is connected to a source of higher pressure fluid thus being effective to apply a clamping force to the mold segments that is sufficiently great to prevent spreading of the segments during the plastic injection and retention phases of the molding process. The clamping motor is arranged to impart the clamping force to the movable platens through toggle links that connect between the movable platen and the end frame. Its disposition in the press is such that the toggle links can be brought into complete overlapping relation when the movable platen is fully retracted.

The platen motors and the clamping motor are operatively connected for sequential operation through a fluid control system effective to automatically operate the platen motors to advance and retract the movable platen at a high velocity but under relatively low fluid pressure. Means are also included to automatically actuate the locking motor after the mold segments attached to the movable and fixed platens, respectively, are brought into registry with one another to impart a high intensity clamping force between mating mold segments that operates through the toggle mechanism by the application of high fluid pressure to the locking motor.

DESCRIPTION OF THE DRAWINGS

FIG. 1 is a side elevation of a mold press incorporating the invention, the mechanism being illustrated with the movable platen advanced;

FIG. 2 is a top plan view as projected from FIG. 1;

FIG. 6 is a side elevation of another embodiment of the invention, the mechanism being illustrated with the movable platen advanced;

FIG. 7 is a top plan view as projected from FIG. 6;

DESCRIPTION OF THE PREFERRED EMBODIMENT

Figure 3:
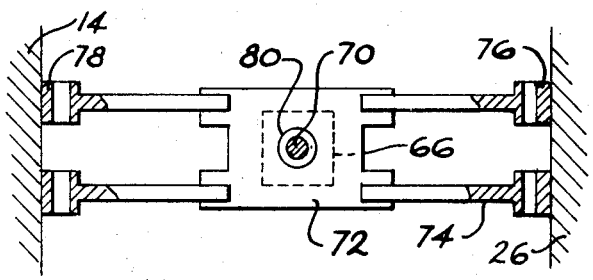
FIG. 3 is a view taken along line 3—3 of FIG. 1.

Referring now to the embodiment of the invention shown in FIGS. 1 through 4, inclusive, there is shown a press assembly 10 comprising a pair of oppositely spaced baseplates 12 and a pair of end plates 14 and 16 extending upwardly from and fixedly attached to each end of the baseplate. The end plates 14 and 16 are secured together by tie rods 18 which are shown as being four in number disposed to extend between and connect the opposed end plates adjacent the four corners thereof. The tie rods 18 are connected to the end plates by means of nuts 20 threaded upon opposite ends thereof and engaging the remote sides of the end plates. In the preferred embodiment of the invention the tie rods 18 are each enclosed by guide sleeves 22 extending between the opposed end plates 14 and 16 against which the ends of the sleeves bear. End plate 16 is adapted to retain one mold segment 24 of a pair that comprise the complete mold and is hereinafter referred to as the fixed platen.

The baseplate 12, end plates 14 and 16, and tie rods 18 form the essential parts of the press frame and, as such, are formed of heavy construction in order to withstand the extreme stress generated by the heavy pressures to which the parts of the press are subjected during the injection molding cycle.

The press 10 includes a movable platen 26 which is adapted to attach the other segment 28 of the mold pair. The movable platen 26 is slidably guided upon the guide sleeves 22 which extend through appropriate bores provided in the platen for this purpose. The weight load of the movable platen 26 may be carried upon slide ways formed in the baseplate 12 but in the disclosed embodiment no such slide ways are shown, the tie rods 18 and sleeves 22 having sufficient strength to support the platen. The platen 26, shown in FIGS. 1 and 2 in its advanced or closed position with the mold segments 24 and 28 having their opposed faces forced against one another at high pressure by fluid motor means hereinafter described. The fluid motor means operates the movable platen 26 through a toggle link mechanism, indicated generally as 30, which connects between the end plate 14 and the platen 26.

Figure 4:
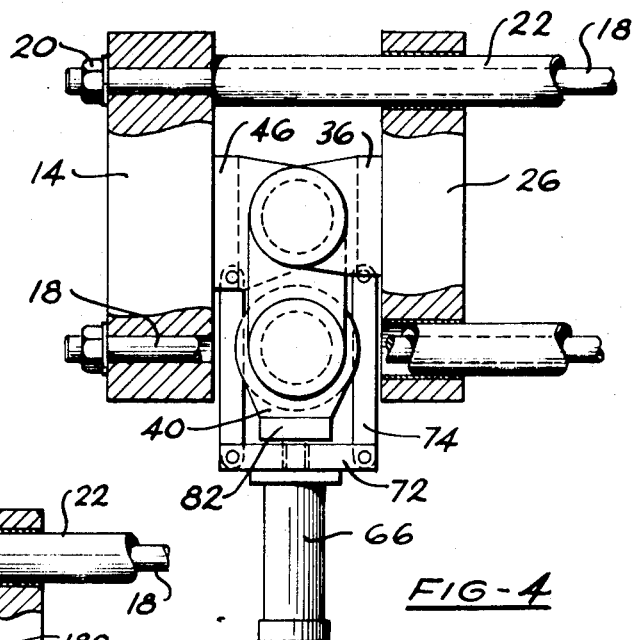
FIG. 4 is a partial view similar to that of FIG. 1 but with the mechanism being illustrated with the movable platen retracted.

The toggle mechanism 30 comprises a pair of links 32 oppositely spaced from the centerline of the movable platen and each having one end thereof pivotally mounted to the platen by means of pins 34 retained in appropriate brackets 36 on the rear face of the platen. The other end of the links 32 are pivotally mounted by means of a pin 38 that extends through a knuckle sleeve 40 that is formed at one end of the complimentary link 42 of the mechanism. The link 42 is a single link that is pivotally connected by means of pin 44 to bracket 46 formed on the adjacent end of a link adjustment screw 48 which is threadedly mounted in a mating threaded aperture provided in the center of the end plate 14. During operation of the press the link adjustment screw 48, whose function is described hereinafter, is maintained in fixed relation to the end plate 14 thereby fixing the location of the pin 44 that forms the stationary end of the toggle mechanism 30. The brackets 36 are so disposed on the platen 26 such that their inner facing surfaces 50 will clear the opposite outer surfaces 52 of the bracket 46 when the platen is in its fully retracted position as shown in FIG. 4.

The movable platen 26 and its mold segment 28 during operation of the press 10 is adapted to be advanced and retracted between its open and closed positions by means of a first fluid motor means, indicated as platen motors 54. The platen motors 54 comprise two fluid-operated piston-cylinder arrangements mounted on opposite sides of the frame and adapted to operate the platen during the traverse stages of its operation. The platen motors 54 each consist of a fluid pressure cylinder 56 fixedly attached to opposed side edges of the end plate 14 by means of mounting brackets 58. As shown in FIG. 2, the cylinders 56 are mounted with their leading ends closely adjacent the inner face of the end plate 14 with their other ends extending rearwardly beyond the rear surface of the plate. Pistons fluidly actuated within the cylinders 56 have piston rods 60 whose leading ends are secured to the opposite side edges of the platen 26 by means of vertical pins 62 mounted in mounting brackets 64.

In the drawings, the platen motors 54 are shown as being attached to the opposed side edges of the end plate 14 and platen 26 in laterally spaced alignment with the axis of the tie rods 13 at diagonally opposed corners of the frame. With the motors being so disposed jamming of the platen 26 on the guide sleeves 22 during its movement therealong is prevented. It should be understood however that this disclosed location of the platen motors is not essential to free motion of the platen. Such freedom from jamming will be provided equally as well with the motors being disposed on any location along the edges of the frame so long as a line or plane connecting the axes of the motors will intersect the centerlines of the frame.

The platen motors 54, because they require only sufficient force to impart linear motion to the movable platen 26 between its open and closed positions, are connected to a source of relatively low fluid pressure for operating the piston rods 60. For example, the cylinder 56 may be connected to a source of fluid of about 300 p.s.i. pressure in contradistinction to the cylinder of locking motor 66 described hereinafter which is operated by fluid at about 1,500 p.s.i. pressure. As shown, the cylinders 56 are of small diameter and therefore capable of imparting a high traverse velocity to the platen 26 in moving it between its open and closed positions due to their low volume capacity.

The locking motor 66, which is actuated to operate the movable platen 26 after the platen motors 54 have moved the platen to its extended position is a double-acting fluid motor comprising cylinder 68 in which a piston (not shown) having a piston rod 70 is operated by high-pressure fluid. In the embodiment shown in FIGS. 1 through 4, the locking motor cylinder 68 is vertically suspended from a floating platform 72 that is slung beneath the toggle mechanism 30 by means of connecting arms 74 that are pivotally connected between each of the four corners of the platform and brackets 76 and 78, respectively, provided on the facing sides of the end plate 14 and movable platen 26. The platform 72 contains a central opening 80 to permit passage of the piston rod 70 whose upper end is operatively secured by means of a threaded connection or the like to a boss 82 on the under surface of the knuckle sleeve 40. The arrangement of the locking motor 66 is such that, as the movable platen 26 is extended the platform 72 due to the pivotal connection of the connecting arms 74 will be raised thus moving the cylinder 68 upwardly. Also, advance movement of the platen 26 will cause the pin connection 36 at the knuckle of the toggle mechanism 30 to move forwardly and upwardly thus tending to draw the piston rod 70 and its connected piston upwardly a slight amount within the cylinder 68. This movement of the fluid motor prior to actuation is compensated for by means provided in the hydraulic system hereinafter described. When, however, the mating faces of the mold segments 24 and 28 are brought into registry with one another, high-pressure fluid is admitted to the cylinder 68 to apply, in conjunction with the toggle mechanism 30, an extremely high clamping force between the mating mold segments.

Figure 5:
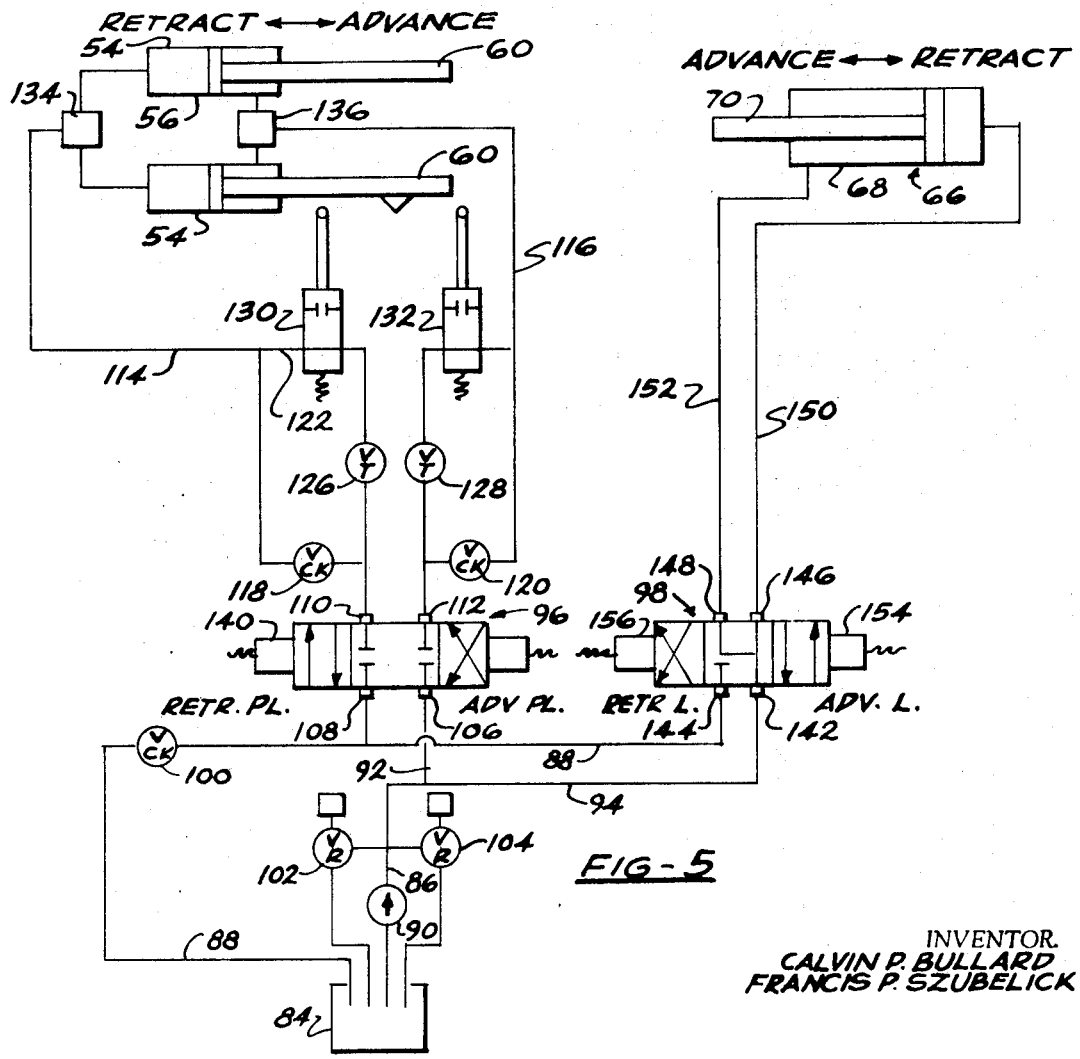
FIG. 5 is a schematic representation of the fluid control system employed in the invention.

The hydraulic system employed to operate the various components of the press of the instant invention is illustrated schematically in FIG. 5. As shown the hydraulic system comprises a reservoir 84 having a supply line 86 emanating therefrom for supplying the various fluid-operated components of the press and a return line 88. The supply line 86 contains a motor driven pump 90 and two branches 92 and 94 extending each to one port of control valves 96 and 98 employed for operating the platen motors 54 and the lock motor 66, respectively. The return line 88 contains a check valve 100 for preventing reverse flow of fluid from the reservoir through the line. The motor driven pump 90 is a high volume pump whose fluid outlet pressure is controlled by a pair of electrically actuated pressure relief valves 102 and 104 disposed in the supply line and having overflow discharge lines extending into the reservoir. Appropriate electrical circuitry (not shown) is operatively connected to the relief valve operators such as to actuate valve 102 when valve 104 is deactivated and vice versa. Relief valve 102 has a typical relief setting of about 300 p.s.i. or whatever fluid pressure is necessary to apply motive force to the platen motors 54 during the advance and retract phases of their operation. Relief valve 104, on the other hand, typically has a relief setting of about 1,500 p.s.i., this being determine to be a sufficient fluid pressure to apply an adequate locking force between the clamped mold segments 24 and 28. Thus, relief valve 102 is actuated to provide a relatively low( 300 p.s.i.) fluid pressure in the hydraulic system to operate the platen motors 54 to their advance or retract position while relief valve 104 is actuated to provide high ( 1,500 p.s.i.) fluid pressure in the system during the lock phase of press operation.

The control valves 96 and 98 are each electrically actuated, reversible four-way valves that are independently operable to advance or retract the platen motors 54 and lock motor 66, respectively. The platen motor control valve 96 has four connecting parts 106 through 112 for connecting the valve into the system. Port 106 is connected to branch 92 of supply line 86 while port 108 is connected to the reservoir return line 88. From ports 110 and 112, respectively, two lines 114 and 116 extend to connect the platen motors 54 in parallel on each side of the pistons which are operable in each. Each of the lines 114 and 116 contain check valves 118 and 120 and a bypass, 122 and 124, respectively, the latter each containing a manually adjustable flow regulating valve 126 and 128 and a mechanically operated deceleration valve 130 and 132 of known construction. The deceleration valves 130 and 132 are connected by appropriate camming mechanism (not shown) to the platen motor piston rods to gradually restrict fluid flow through the bypass lines 122 and 124 in order to decelerate the motion of the platen motors 54 just prior to the ends of their advance and retract strokes. Each of the lines 114 and 116 connect to the platen motors 54 flow integrator 134 and 136 in order to insure uniform supply of fluid to both motors during their motive periods.

The platen motor control valve 96 is actuated to each one of its two actuated positions by independently operated electrical controllers 138 and 140. Controller 138 is operative, when actuated, to internally connect ports 106 and 110 of the valve for passage of fluid through line 114 to the platen motors 54 for effecting advance of the movable platen. At the same time ports 108 and 112 of the valve are internally connected for the passage of return fluid from line 116 to the return line 88. Controller 140, when actuated, is operative to retract the platen motors 54 by connecting ports 106 and 112 which effects passage of fluid from line 92 to line 116 and ports 108 and 110 for passage of return fluid from line 114 to return line 88.

The lock motor control valve 98 has four connecting ports 142 through 148. Ports 142 and 144 connect the valve to branch 94 and return line 88, respectively, while ports 146 and 148 connect to either side of the operating piston of the lock motor 66 through lines 150 and 152, respectively. As shown, in its deactivated position, the valve 96 is arranged such that port 146 is connected in common with ports 142 and 148. By means of this arrangement low-pressure fluid is permitted to pass from branch 94 through line 150 to the underside of the lock motor piston such that the piston which is connected for movement with the toggle mechanism 33 will be advanced with the movable platen. Also fluid from line 152 is caused to flow between ports 146 and 148 thereby insuring that at all times the cylinder of lock motor 66 is completely filled with operating fluid.

Associated with the control valve 98 are two independently operable, electrically actuated controllers 154 and 156. Controller 154, when actuated, serves to connect port 142 with port 146 to supply high-pressure fluid from branch 94 through line 150 to the lock motor 66 for advancing the lock motor piston such that it will impart a locking force to the movable platen through the toggle mechanism. At the same time ports 144 and 148 are connected for passage of return fluid from line 152 to return line 88. Controller 156 is actuated to retract the lock motor 66 by effecting the internal connection of port 144 with port 148 and port 142 with 146 thereby connecting branch 94 with line 152 and line 150 with return line 88.

The operation of the herein described mold press apparatus is as follows. With the movable platen 26 in its retracted position as shown in FIG. 4 pressure relief valve 102 is actuated and valve 104 deactivated such that pump 90 will deliver low-pressure operating fluid to the system. Simultaneously with or immediately after actuation of valve 102 platen motor advance controller 138 is actuated to connect port 106 of control valve 96 in common with port 110 and port 108 with port 112. Thus low-pressure operating fluid is passed from branch 92 of supply line 86 through line 114 and check valve 118 to the rear side of the operating pistons of the platen motors 54 thereby advancing the movable platen 26. The velocity of the platen travel is regulated by the flow of return fluid from the front side of the piston through the bypass 124 in line 116 by means of the throttle valve 128. In the bypass 124 deceleration valve 132 which is cam-connected to the platen motor piston rods 60 to gradually restrict the flow of fluid through the line just prior to the platen 126 reaching its full advance position thereby to reduce the velocity of the platen in order to prevent damage to the mold segments 24 and 28 when they are brought into registry with one another.

During advance travel of the movable platen 26 low-pressure operating fluid is passed from branch 94 through line 150 to the underside of the lock motor piston, control valve 98 being in its deactuated position shown in FIG. 5 to assist the movement of the piston upwardly to compensate for the movement of the platen and toggle mechanism 33. Fluid released from the top portion of the lock motor cylinder is passed through line 152 and will flow into line 150, ports 146 and 148 of the control valve 96 being connected in common. This will insure the presence of a completely filled lock motor cylinder during movement of the movable platen.

When the movable platen 26 reaches its closed position with the mold segments 24 and 28 in registry with one another, the links 32 and 42 of the toggle mechanism 30 are disposed just short of their straight out disposition shown in FIGS. 1 and 2. At this point the controllers associated with pressure relief valves 102 and 104 are deactuated and actuated, respectively. At the same time, controller 154 of lock motor control valve 98 is actuated. These actions can be accomplished by appropriate manually operated switch means or by means of a limit switch mechanism that is actuated when the platen 26 achieves its advanced position. Deactuation of relief valve 102 terminates the flow of low-pressure operating fluid in the system and actuation of relief valve 104 effects the supply of high-pressure fluid thereto. Similarly, actuation of controller 154 effects the supply of high-pressure fluid to the cylinder of lock motor 66 for advancing the piston, parts 142 and 146 being placed in common while return fluid is passed from the cylinder through line 152 to return line 88, ports 144 and 148 also being placed in common. Advancing the lock motor piston applies a force to toggle mechanism 30, the piston rod being connected to knuckle sleeve 40 and this, in turn, effects the application of an extremely high locking pressure between the two mold segments 24 and 28. This locking pressure is maintained while molten plastic is injected into the mold and for the period of time required for the plastic to set whereupon controller 154 of the lock motor control valve 98 is thereafter deactuated and controller 156 actuated to reverse the flow of operating fluid through lines 150 and 152 to retract the lock motor piston to a position such that the linear links 32 and 42 are again angularly related such that linear movement of the platen 26 can be undertaken by the platen motors 54. When this occurs controller 156 and the pressure relief valve 104 are deactuated and valve 102 and controller 142 of the platen motor control valve 96 are actuated to supply low-pressure operating fluid to the system and to retract the movable platen 26 at a high velocity by reversing the flow of fluid through lines 114 and 116, port 106 now being connected in common with port 112 and port 108 with port 110. During retractive movement of the platen deceleration valve 130 in bypass 122 is operative to gradually restrict the flow of return fluid for reducing the velocity of the platen just prior to its reaching its fully retracted position in order to prevent excessive impact to the press components.

Thus, by means of the invention, there is provided novel mold press apparatus that includes two independently operated fluid motor means, one to impart linear motion to the movable platen between its open and closed positions and the other to apply high-intensity locking pressure between the mold segments during the plastic injection and setting phases of the molding operation. By means of this arrangement the platen motors can be selected or designed to produce high-velocity linear travel of the movable platen and at a reduced pressure thereby rendering the operation more efficient by reducing the time necessary to achieve advancement and retraction of the movable platen. Likewise the lock motor can be selected or designed to produce sufficient clamping pressure between the mold segments carried by the platens without affecting movable platen movement. Also, by locating the platen motors externally of the tie rods that define the movable platen guide way the length of stroke of that platen can be considerably extended over press arrangements heretofore known in the art thereby permitting a press frame of given size to accommodate molds of increased dimensions over those previously capable of being accommodated by a press frame of the same size.

Adjustability of the press mechanism such that it can accommodate mold segments of various lateral dimensions is obtained by means of the fact that the brackets 46 that attach the fixed end of the toggle mechanism 30 are mounted on the end of a threaded worm or screw 48, hereinbefore referred to as the toggle adjustment screw, that is mounted for linear adjustment in the end plate 14. As shown in FIG. 2, the end plate 14 is apertured to receive a threaded captive nut 160 and bushing 162. The nut 160 and bushing 162 are axially secured within the end plate 14 by means of a closure ring 164. The rear end of the captive nut 160 extends beyond the rear of the end plate and is there provided with gear teeth 166 adapted to mesh with the pinion of a drive mechanism (not shown). By operating the drive mechanism the captive nut can be rotated either clockwise or counterclockwise to axially advance or withdraw the toggle adjustment screw 48 thereby altering the location of the toggle mechanism 30 and concomitantly the space between the movable platen 26 and end plate 18 when the platen is fully extended.

Referring now to FIGS. 6 through 9 of the drawings, there is shown a modified form of mold press incorporating the present invention. The mold press of this arrangement is commonly referred to as a "double toggle" press as opposed to the "single toggle" press of FIGS. 1 through 4. In the description of this embodiment, elements similar to those of the FIGS. 1 through 4 embodiment are indicated by like numerals.

Figure 9:
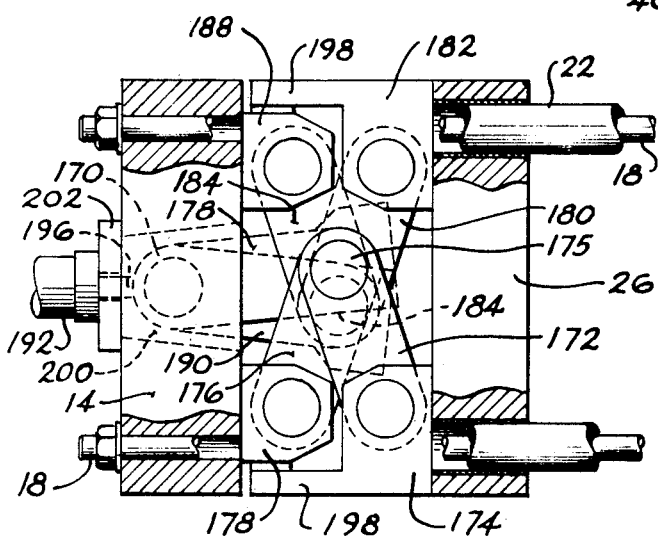
FIG. 9 is a partial view similar to that of FIG. 6 but with the mechanism being illustrated with the movable platen retracted.
Figure 8:
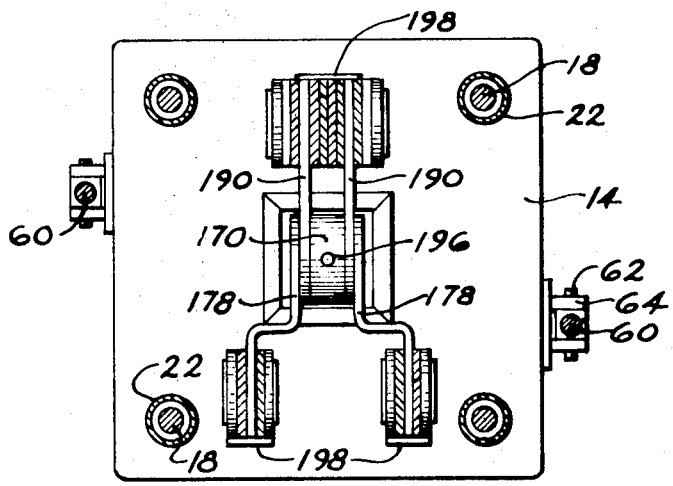
FIG. 8 is a sectional view taken along line 8—8 of FIG. 6.

In this embodiment of the invention the press frame is defined by base plates 12 and upstanding plates 14 and 16, the latter being secured by tie rods 18 which are enclosed by sleeves 22 to define the guide ways for movable platen 26 in a manner similar to the original embodiment. Likewise, the movable platen 26 which attaches the mold segment 28 is imparted with linear traverse movement between its open and closed positions by a pair of platen motors 54 attached to opposite sides of the end frame 14 by means of brackets with their piston rods 60 connecting to the side edges of the platen by means of connecting pins 62 and brackets 64. The toggle link mechanism 30' of this arrangement, however, consists of a multiplicity of oppositely acting link pairs connecting between the fixed plate 14 and movable platen 26 and operated by a cross head 170 in a manner hereinafter described. The links of the toggle link mechanism include oppositely spaced link pairs 172 that are pivotally connected at one end to a pair of brackets 174 spacedly disposed adjacent the lower edge of the movable platen 26. At their other ends the link pairs 172 are connected by means of spaced pivot pins 175 to the ends of complementary link pairs 176, the latter being pin connected at their stationary ends to oppositely spaced brackets 178 adjacent the lower edge of the fixed plate 14. As shown in FIGS. 7 and 8, the pins 175 that interconnect the link pairs 172 and 176 also pivotally mount each of a pair of cross head operating arms 178 that connect the cross head 170 to the link pairs for operating the same. The upper portion of the toggle link mechanism includes spaced link pairs 180 that are pin connected at one end to the pair of brackets 182 adjacent the upper edge of the movable platen 26. Their other ends of the link pairs 180 are pivotally connected to complementary link pairs 184 by means of a single pivot pin 186 that extends through the link pairs 180 and 184. The stationary ends of the link pairs 184 are pivotally connected to brackets 188 adjacent the upper edge of the fixed plate 14. Other operating arms 190 of the cross head 170 are spacedly mounted to the pin 184 intermediate each of the link pairs 180 as shown in FIGS. 7 and 8. As shown best in FIG. 7 the link pairs 180 and 184 together with their connection brackets 182 and 188 that define the upper portion of the toggle link mechanism are disposed intermediate the oppositely spaced link pairs 172 and 176 with their connection brackets 174 and 178 such that there can be considerable overlapping of the links when the movable platen 26 is in its open or retracted position as shown in FIG. 9.

The lock motor 192 operative to impart a high intensity force to the toggle mechanism 30' for applying clamping pressure between the mold segments 24 and 28 consists of a double-acting fluid cylinder 194 centrally mounted on the rear face of the fixed plate 14. The lock motor 192 also includes a reciprocatable piston (not shown) operative within the cylinder and having a piston rod 196 that is threadedly attached at its leading end to the crosshead 170, the latter pivotally mounting at its extremities the other ends of the spaced crosshead operating arms 178 and 190.

Operation of this mold press arrangement is dictated by a fluid system identical to that of FIG. 5 for operating the mold press of FIGS. 1 through 4 such that a repetition of the description of the fluid system as it applies to this embodiment is deemed unnecessary. The operation can readily be comprehended by understanding that application of low-pressure fluid to the platen motors 54 extends the movable platen 26 to its extended position with the mold segments 24 and 28 in registry with one another. As the platen 26 is moved along the guide way the toggle link mechanism 30' is extended to a position just short of straight out such that there is a slight degree of angularity in the complementary link pairs and the crosshead 170 is advanced to a position intermediate the fixed plate 14 and extended platen 26 being drawn to this position through the link pairs 172 and 180 and crosshead operating arms 178 and 190. Thereafter, the lock motor 192 is actuated to extend the piston rod 196 and crosshead 170 under high fluid pressure. This action causes the crosshead operating arms 178 and 190 to extend the pins 175 and 186 thereby applying a high-intensity clamping force to the platen 26 through the link press.

To prevent overextending the link pins 175 and 186 stop members are provided on the platen 26 with means for engaging cooperating shoulders on the crosshead operation arms 178 and 190. Also, in order to accommodate the crosshead 170 and its operating arms 178 and 190 in their retracted position the end plate 14 is provided with a through opening 200 rectangular in section and having diverging sides into which the crosshead is withdrawn as shown in FIG. 9. Because of the presence of the opening 200, it may be necessary to mount the lock motor 192 to the end plate 14 by means of a mounting plate 202 that covers the opening on the rear side of the end plate.

While there have been disclosed herein two embodiments of the present invention, it will be understood that various changes in the details, materials, and arrangements of parts which have been herein described and illustrated in order to explain the nature of the invention, may be made by those skilled in the art within the principle and scope of the invention as expressed in the appended claims.

We claim:

1. In a molding machine of the class described comprising a mold having at least two segments which, when assembled, form a mold cavity, the combination including a two-stage mold press comprising:

a. a supporting frame including:

i. means forming a base,
ii. a pair of longitudinally spaced, fixed plates extending upwardly from the ends of said base,
iii. one of said plates defining a fixed platen adapted to attach one of said mold segments, and
iv. a plurality of tie rods extending between said plates to define a guideway;
b. a movable platen adapted to attach the other of said mold segments being slidably mounted on said tie rods in said guideway for movement between a retracted position and an extended position, the latter placing said mold segments in registry with one another;
c. toggle mechanism operably connected between the other of said fixed plates and said movable platen including:
i. first link means connected at one end to said other fixed plate and at its other end to means forming a knuckle,
ii. second link means connected at one end to said movable platen and at its other end to said knuckle forming means,
iii. the connections of the respective link means to said other plate and to said movable platen being spacedly interrelated for overlapping said connections and said link means when said movable platen is in its retracted position;
d. first fluid motor means connected between said frame and said movable platen for reciprocably moving said movable platen between its retracted and extended positions; and
e. second fluid motor means operably connected to the knuckle forming means of said toggle mechanism for imparting a high-intensity clamping pressure between said mold segments when said movable platen is in its extended position.

2. Apparatus as recited in claim 1 wherein said first fluid motor means comprise a pair of simultaneously actuated piston-cylinder sets connected between said other end plate and said movable platen on opposite sides thereof and externally of said guideway.

3. Apparatus as recited in claim 2 wherein said piston-cylinder sets each comprise:
a. a cylinder of relatively small cross-sectional area mounted to the side edge of said end plate with its open end closely adjacent the inner surface of said end plate;
b. a piston operable in said cylinder and including a piston rod extending from the open end of said cylinder and attaching said movable platen; and
c. means for supplying motive fluid to said cylinder on alternate sides of said piston for reciprocating said movable platen between its retracted and extended positions.

4. Apparatus as recited in claim 3 wherein said second fluid motor means comprises a piston-cylinder set of greater cross-sectional area than the piston-cylinder sets of said first fluid motor means and adapted for connection to a higher pressure source of motive fluid than that operating said first fluid motor means for imparting a high fluid force to said toggle mechanism to produce a high-intensity clamping force between said mold segments.

5. Apparatus as recited in claim 4 including motive fluid supply control means including:
a. means for supplying low-pressure motive fluid to the cylinder of said first fluid motor means to advance the pistons operable therein for moving said movable platen to its extended position;
b. means for simultaneously supplying low-pressure-motive fluid to the cylinder of said second fluid motor means to maintain said cylinder constantly filled as it is extended by movement of said movable platen; and
c. means for terminating the supply of low-pressure fluid to said first and second fluid motor means for supplying high-pressure-motive fluid to the cylinder of said second fluid motor means when said mold segments are in registry with one another.

6. Apparatus as recited in claim 4 wherein:
a. said toggle mechanism comprises oppositely spaced toggle means each including:
i. oppositely acting toggle link means pivotally attached by a connecting pin at one of the ends to each other, one of said toggle link means being pivotally connected at its other end to said movable platen and the other toggle link means having its other end pivotally connected to said end plate,
ii. a linearly movable crosshead,
iii. operating arms pivotally connected at their respective ends to said crosshead and to said connecting pins for operating said toggle means in opposite directions, and
b. said second fluid motor means comprises:
i. a cylinder having its open end attached to the rear side of said end plate,
ii. a piston operable in said cylinder,
iii. a piston rod extending from said piston, through said end plate and connecting said crosshead for imparting linear reciprocating movement thereto.

7. Apparatus as recited in claim 4 wherein said toggle mechanism includes one link means comprising a single link substantially centrally disposed between said tie rods, one end of said single link being pivotally connected to a bracket adapted to receive said link and its other end forming a knuckle sleeve and the other link means comprising a pair of oppositely spaced links having one of their ends pivotally connecting said knuckle sleeve and their other ends pivotally connected to brackets oppositely spaced a distance greater than the width of said single link-connecting bracket whereby said link means will assume an overlapped condition with said movable platen in its retracted position.

8. Apparatus as recited in claim 7 wherein the bracket attaching said one link means is mounted to said end plate and those mounting said other link means are mounted to said movable platen.

9. Apparatus as recited in claim 8 including means for disposing said second fluid motor means in subtended relation to said knuckle sleeve, said means comprising:
a. a platform spaced from said knuckle sleeve, said platform including means for mounting the open end of the cylinder of said second fluid motor means to the underside thereof and an opening for passing the piston rod operative in said cylinder for connection with said knuckle sleeve, and
b. pivot arm means connecting said platform between said movable platen and said end plate for parallel movement of said platform with said knuckle sleeve.

10. Apparatus as recited in claim 9 including means for mounting said one link means to said end plate comprising:
a. a captive nut rotatably secured in said end plate;
b. a worm operated by said captive nut for axial movement normal to said end plate, said worm attaching the bracket for said one link means at the end thereof, and
c. means for rotating said captive nut to adjust the position of said bracket with respect to said end plate.